No. 641,483. Patented Jan. 16, 1900.
J. WINTER, Jr.
PHOTOGRAPHIC NEGATIVE VIGNETTER.
(Application filed Oct. 5, 1897. Renewed Nov. 27, 1899.)

(No Model.)

WITNESSES
H. B. Smith
M. A. Leyden

INVENTOR
John Winter Jr.
By E. Laass
his ATTORNEY

UNITED STATES PATENT OFFICE.

JOHN WINTER, JR., OF SYRACUSE, NEW YORK.

PHOTOGRAPHIC-NEGATIVE VIGNETTER.

SPECIFICATION forming part of Letters Patent No. 641,483, dated January 16, 1900.

Application filed October 5, 1897. Renewed November 27, 1899. Serial No. 738,451. (No model.)

*To all whom it may concern:*

Be it known that I, JOHN WINTER, Jr., of Syracuse, in the county of Onondaga, in the State of New York, have invented new and useful Improvements in Negative-Vignetters, of which the following, taken in connection with the accompanying drawings, is a full, clear, and exact description.

This invention relates to the class of photographic appliances which are attachable to cameras for the purpose of vignetting therein the negative.

The object of my invention is to provide a simple, inexpensive, and more convenient and efficient vignetting device of the aforesaid class; and to that end the invention consists, essentially, in the combination of a bracket supported on the camera, an arm extending from said bracket and adjustable to different angles of inclination, and a vignetting-board mounted on said arm; and the invention also consists in novel features of the details of construction, as hereinafter more fully described, and set forth in the claims.

Figure 1:
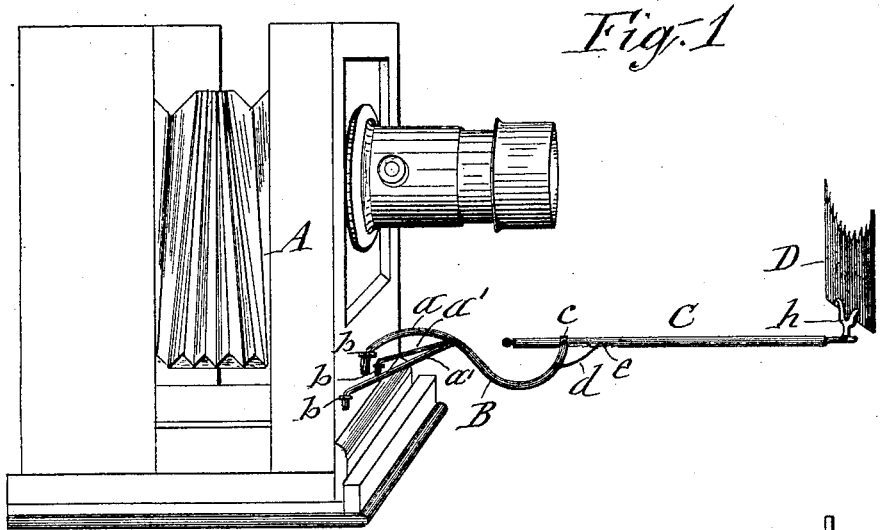
Figure 2:
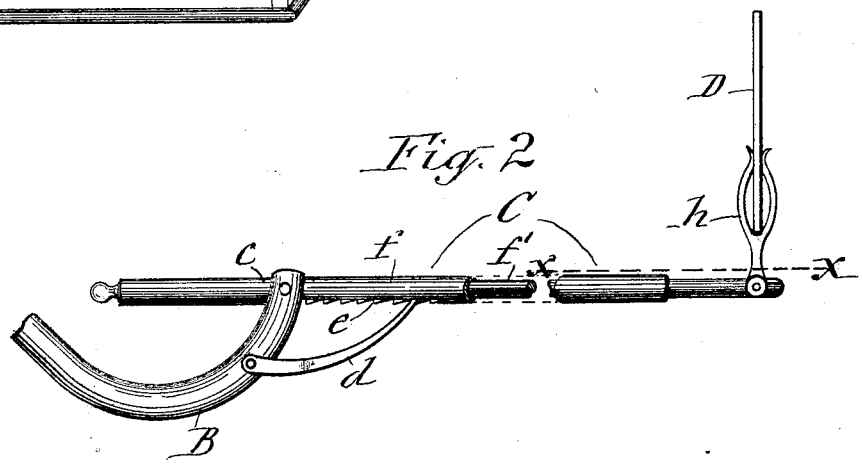
Figure 3:

In the accompanying drawings, Figure 1 is a perspective view of my improved vignetter attached to a camera. Fig. 2 is an enlarged detail view of said vignetter, and Fig. 3 is a further-enlarged plan view taken directly under the line X X in Fig. 2.

Similar letters of reference indicate corresponding parts.

A denotes a photographic camera to which my improved vignetter is detachably connected. Said vignetter is supported on the camera preferably by means of a bracket B, which is formed at one end with braces $a$ and $a'$, terminating with suitable feet, which are inserted in eyes $b$ $b$ $b$ or other suitable steps secured to the camera. To this bracket is flexibly connected an arm C, which can be adjusted to different angles of inclination and supports on its free end the vignetting board or shield D. I preferably pivot said arm at one end to the bracket, as shown at $c$, so as to allow it to be swung vertically to its desired position, in which it is retained by a brace $d$, pivoted to the bracket B and adapted to engage by its free end with a ratchet $e$ on the under side of the arm C. Said ratchet may be either formed directly on the arm, as shown, or formed on a plate rigidly secured to the arm.

To allow the vignetting-board to be set different distances from the camera as may be desired, I form the arm C extensible in length, preferably by forming said arm of a metallic tube $f$, pivoted at one end to the bracket B, as aforesaid, and a rod $f'$, sliding longitudinally in said tube and carrying on its free end a suitable holder $h$ for supporting the board or shield D.

It will be observed that the described vignetter is readily applied to a camera by inserting the free ends or feet of the braces $a$ and $a'$ of the supporting-bracket B into the eyes $b$ $b$ $b$, and when thus secured the free end of the arm C can be readily raised or lowered and adjusted in its position to carry the vignetting-board D in proper position in front of the lens.

What I claim as my invention is—

1. A vignetter for photographic cameras, consisting of a bracket supported on the camera, an arm flexibly connected at one end to said bracket to permit said arm to be deflected to different angles of inclination, a brace on said bracket and adjustably supporting said arm in its position, and a vignetting-board supported on the free end of said arm, as set forth.

2. A vignetter for photographic cameras, consisting of a bracket supported on the camera, an arm pivoted to said bracket movable to different angles of inclination, a ratchet on said arm, a brace pivoted to the bracket and adapted to engage the ratchet, and a vignetting-board mounted on the free end of the arm, as set forth.

3. The combination with a photographic camera, of a bracket supported on said camera, a metallic tube pivoted at one end to said bracket to swing vertically thereon, a ratchet on the under side of said tube, a brace pivoted to the bracket and adapted to engage the ratchet to support the tube in its position, a rod sliding in said tube, and a vignetting-board supported on the free end of said rod, as set forth.

4. The combination with a photographic camera, of a bracket supported on the camera, a metallic tube pivoted at one end to said bracket to permit said tube to be deflected to different angles of inclination, a brace on said bracket and adjustably supporting said tube in its position, a rod sliding in said tube, and a vignetting-board mounted on the free end of said rod, as set forth.

In testimony whereof I have hereunto signed my name this 30th day of September, 1897.

JOHN WINTER, JR. [L. S.]

Witnesses:
J. J. LAASS,
H. B. SMITH.